United States Patent
Hutchison et al.

(10) Patent No.: US 11,176,047 B2
(45) Date of Patent: Nov. 16, 2021

(54) DATA STORAGE SYSTEM WITH PHYSICAL STORAGE AND CACHE MEMORY

(71) Applicant: International Business Machines Corporation, Armonk, NY (US)

(72) Inventors: Gordon D. Hutchison, Eastleigh (GB); Miles Mulholland, Chandlers Ford (GB); Lee J. Sanders, Chichester (GB); Ben Sasson, North Baddesley (GB); William J. Scales, Fareham (GB)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 15/670,830

(22) Filed: Aug. 7, 2017

(65) Prior Publication Data

US 2019/0042442 A1    Feb. 7, 2019

(51) Int. Cl.
*G06F 12/08* (2016.01)
*G06F 12/02* (2006.01)
(Continued)

(52) U.S. Cl.
CPC ........ *G06F 12/0871* (2013.01); *G06F 3/0631* (2013.01); *G06F 3/0641* (2013.01); *G06F 3/0689* (2013.01); *G06F 12/0246* (2013.01); *G06F 12/0253* (2013.01); *G06F 12/126* (2013.01); *G06F 2212/601* (2013.01)

(58) Field of Classification Search
CPC ............... G06F 12/0871; G06F 3/0631; G06F 12/0246; G06F 12/0253
See application file for complete search history.

(56) References Cited

U.S. PATENT DOCUMENTS 8,332,612 B1    12/2012    Raizen et al.
2006/0087893 A1*    4/2006    Nishihara ........... G06F 12/0246
                                                                365/145
(Continued)

OTHER PUBLICATIONS

Wu, Suzhen, et al., "GCaR: garbage collection aware cache management with improved performance for flash-based SSDs (Abstract Only)," ICS '16 Proceedings of the 2016 International Conference on Supercomputing, Article No. 28, Istanbul, Turkey Jun. 1-3, 2016, Available at: http://dl.acm.org/citation.cfm?id=2926263.
(Continued)

*Primary Examiner* — Masud K Khan
(74) *Attorney, Agent, or Firm* — Nelson IP; Daniel P. Nelson

(57) ABSTRACT

A data storage system comprises physical storage, cache memory and a processor connected to the physical storage and the cache memory. The processor is arranged to maintain a set of active regions in the cache memory, each active region having a size equal to an integer multiple of an update size of a flash chip within the physical storage, where the integer could be 1. The processor receives requests for one or more blocks of the cache memory from components within the storage system and allocates one or more blocks from an active region in response to a received request. If the processor determines that all blocks in an active region have been allocated and that all allocated blocks within this region have been written to, then the processor destages the content of this region to the physical storage.

15 Claims, 13 Drawing Sheets

(51) Int. Cl.
*G06F 3/06* (2006.01)
*G06F 12/12* (2016.01)
*G06F 12/0871* (2016.01)
*G06F 12/126* (2016.01)

(56) References Cited

U.S. PATENT DOCUMENTS

| | | | |
|---|---|---|---|
| 2009/0222621 A1* | 9/2009 | Ash | G06F 3/0613 |
| | | | 711/112 |
| 2011/0055458 A1* | 3/2011 | Kuehne | G06F 12/0246 |
| | | | 711/103 |
| 2011/0258391 A1* | 10/2011 | Atkisson | G06F 11/108 |
| | | | 711/118 |
| 2015/0347296 A1 | 12/2015 | Kotte et al. | |
| 2016/0103617 A1 | 4/2016 | Kang et al. | |
| 2016/0283161 A1 | 9/2016 | Mielke et al. | |
| 2016/0321171 A1* | 11/2016 | Kanno | G06F 12/0246 |
| 2016/0378621 A1* | 12/2016 | Amidi | G06F 11/1662 |
| | | | 714/6.2 |

OTHER PUBLICATIONS

Chang, Da-Wei, et al., "BLAS: block-level adaptive striping for solid-state drives (Abstract Only)," ACM Transactions on Design Automation of Electronic Systems, Mar. 2014, Available at: https://www.researchgate.net/publication/262315753_BLAS_Block Level_Adaptive_Striping_for_Solid-State_Drives.

* cited by examiner

DATA STORAGE SYSTEM WITH PHYSICAL STORAGE AND CACHE MEMORY

BACKGROUND

The present invention relates to a data storage system that uses physical storage and cache memory and to a method of operating the data storage system.

SUMMARY

According to a first aspect of the present invention, there is provided a method of operating a data storage system comprising physical storage, cache memory and a processor connected to the physical storage and the cache memory, the method comprising maintaining a set of active regions in the cache memory, each active region having a size equal to an integer multiple of an update size of a flash chip within the physical storage, receiving requests for one or more blocks of the cache memory, allocating one or more blocks from an active region in response to a received request, determining that all blocks in an active region have been allocated and that all allocated blocks within this region have been written to, and destaging the content of this region to the physical storage.

According to a second aspect of the present invention, there is provided a data storage system comprising physical storage, cache memory and a processor connected to the physical storage and the cache memory, the processor arranged to maintain a set of active regions in the cache memory, each active region having a size equal to an integer multiple of an update size of a flash chip within the physical storage, receive requests for one or more blocks of the cache memory, allocate one or more blocks from an active region in response to a received request, determine that all blocks in an active region have been allocated and that all allocated blocks within this region have been written to, and destage the content of this region to the physical storage.

According to a third aspect of the present invention, there is provided a computer program product for controlling a data storage system comprising physical storage, cache memory and a processor connected to the physical storage and the cache memory, the computer program product comprising a computer readable storage medium having program instructions embodied therewith, the program instructions executable by a processor to cause the processor to maintain a set of active regions in the cache memory, each active region having a size equal to an integer multiple of an update size of a flash chip within the physical storage, receive requests for one or more blocks of the cache memory, allocate one or more blocks from an active region in response to a received request, determine that all blocks in an active region have been allocated and that all allocated blocks within this region have been written to, and destage the content of this region to the physical storage.

BRIEF DESCRIPTION OF THE DRAWINGS

Preferred embodiments of the present invention will now be described in more detail, by way of example only, with reference to the following drawings, in which.

DETAILED DESCRIPTION

Figure 1:
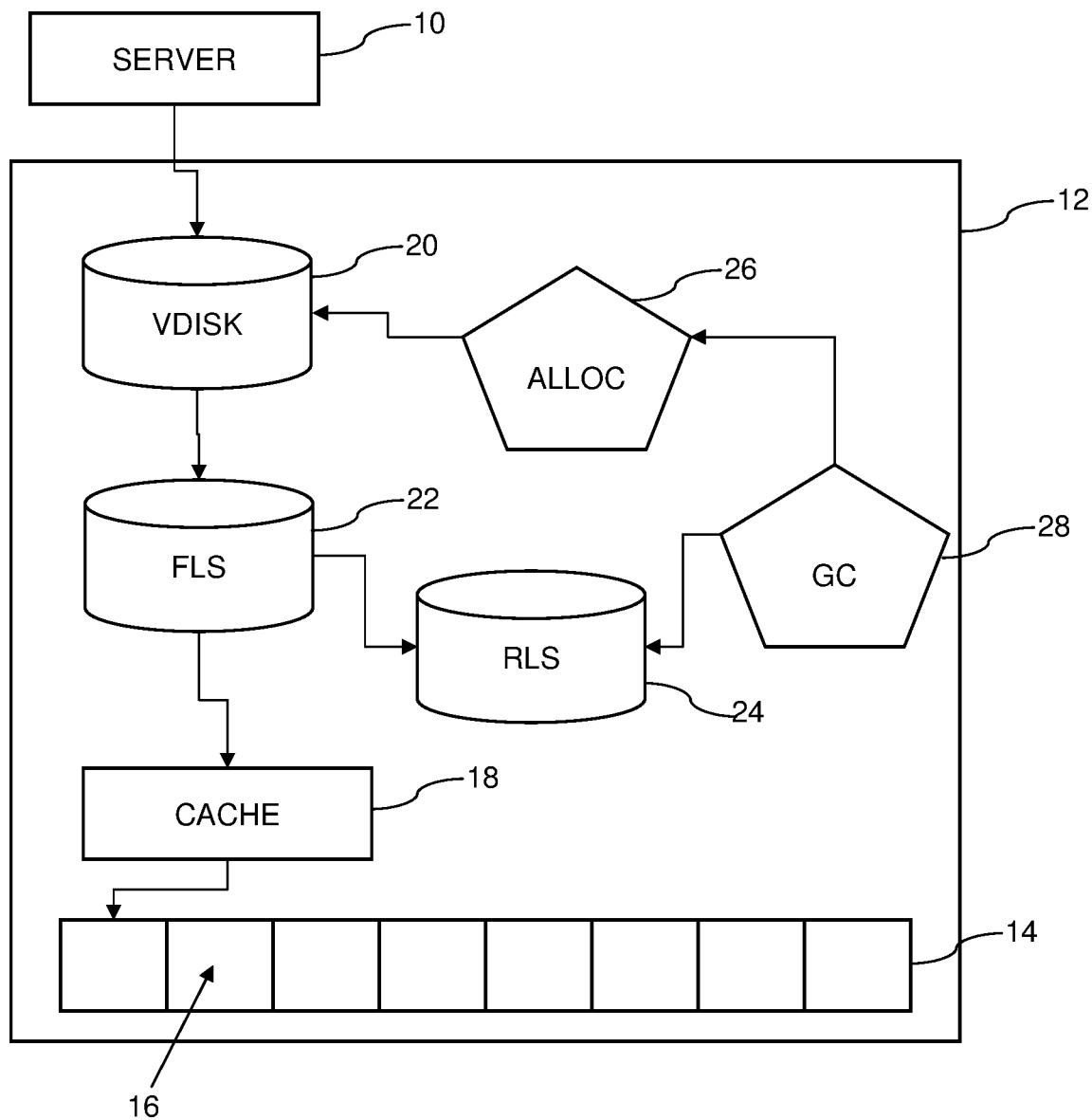
FIG. 1 is a schematic diagram of a server connected to a storage system.

FIG. 1 shows a server 10 connected to a storage system 12. The server 10 performs read and write actions with respect to the storage system 12 via an interface, for example an interface using a standard such as SCSI (the Small Computer System Interface). The storage system 12 has a number of connected physical components that provide processing and storage functions. The primary long term storage function is provided by a set of physical storage 14 (which is preferably comprised of a set of disks), which is split into logical allocation regions 16. Additional memory is also provided within the storage system 12 by a write cache 18, which is used locally by the processing components of the storage system 12.

From the point of view of the external server 10, the storage system 12 presents one or more virtual disks 20 (vdisks) that are presenting the stored data in a logical fashion to the external server 10. Data that is represented as being present on a single vdisk 20 to the server 10, may actually be stored on different disks 14 within the actual physical storage domain 14. Mapping between the vdisks 20 and the physical disks 14 is managed by two components within the storage system 12, a forward lookup structure 22 and a reverse lookup structure 24. The forward lookup structure 22 maps one or more addresses within the vdisk 20 to the actual physical location(s) within the disks 14 where the data is stored. The reverse lookup structure 24 maps the physical location(s) within the disks 14 back to the address(es) within one or more of the vdisks 20.

When a read arrives at the vdisk 20 from the server 10, the vdisk 20 communicates with the forward lookup structure 22 to obtain the physical address of the data and then reads the data required from the address within the physical domain 14. In the case of a read, no change to either of the forward lookup structure 22 or the reverse lookup structure 24 is required.

The behaviour when a write arrives at the vdisk 20 from the server 10 is more complicated. When new data is written to the disks 14, the forward lookup structure 22 must be updated to connect the address of the new data in the vdisk 20 with the physical location of the data as it is actually stored within the disks 14. In this case, both the forward lookup structure 22 and the reverse lookup structure 24 must be updated to reflect the connection between the data presented to the server 10 by the vdisk 20 and the actual physical location in the disks 14 where the data is stored.

The storage system 12 also includes two further components, a storage allocator 26 and a garbage collector 28. The storage allocator 26 performs a number of functions, primarily around allocating live blocks from live regions 16 within the physical domain 14, which are communicated to the vdisks 20, and maintaining free lists for the allocated data, this is described in more detail below, with reference to FIG. 2. When new data is to be written within the storage system 12 the forward lookup structure 22 writes to locations determined by the allocated block location. The top-level storage allocator 26 has a set of "active" regions 16 which are tracked at any given time. A finite number of these regions 16 can be tracked. For example, in an exabyte physical domain 14, with a region size of one gigabyte (for example), this would result in tracking over one billion regions. Even if a region entry within the storage allocator 26 only cost 4B (i.e. tracked how many blocks in the region 16 were available), this would cost 4 GB worth of memory, which is memory that is better used as cache. Therefore, a set of active regions 16 is maintained, up to N regions 16 large (where N is the maximum that can be handled by the cache 18). When all storage in an active region 16 is exhausted, this full region 16 exits the set of active regions 16, the memory used to track the region 16 can be reclaimed, and, if applicable, garbage collection performed by the garbage collector 28. When all N regions 16 are active, no further regions 16 can be allocated and this means that no free list (a list of the unallocated blocks of memory) can receive additional host blocks. The garbage collector 28 essentially reclaims regions 16 with limited live data present by rewriting the remaining live data to new regions 16, which frees these reclaimed regions 16 back to the storage allocator 26. The garbage collector 28 connects to the reverse lookup structure 24 which is used to perform the garbage collection.

The storage system 12 is presented to the server 10 as being thin-provisioned (also known as space-efficient) where the underlying storage can be far smaller than what is present to a host (the server 10). This is achieved by a metadata structure mapping the virtual domain writes to the physical domain, and by compression and deduplication. Implementations making use of compression must implement a mechanism for space recovery, known as garbage collection, this is because there is no guarantee that any two writes to the same virtual address will make use of the same amount of physical storage. Before long, a disk 14 is left with many small areas of free-space, and it is desirable to coalesce these by moving writes in the physical domain (and updating their mapping in the virtual domain).

Tier 1 flash, which can be used for part or all of the disks 14, is solid state storage with relatively poor write-lifetimes, but these types of flash chips are generally significantly cheaper than traditional enterprise flash products. To make optimal use of this storage, the storage system 12 is configured to attempt to write to an entire flash chip in a single pass. To achieve this, relatively large units of allocation are necessary. Ideally the storage system 12 wishes to allocate an entire chip's worth of storage and reuse whole chips worth of storage. These chips can be in the range of gigabytes of storage, which means that if the storage system 12 allocates an entire chip to a host's space-efficient disk in the storage system 12, this will make poor use of available storage if there are, for example 10000 host-presented disks (most being idle). To work around this, the storage system 12 is configured to divide the unit of garbage collection from the unit of host-allocation. In the context of the storage system 12, the smaller host-disk allocation sized areas are referred to as "blocks" and the larger garbage collection sized areas are referred to as "regions". Each region 16 comprises a plurality of blocks. The region size is preferably equal to the update size of a single flash chip within a flash drive or to a multiple of the update size. The region size may be 1 GB and the cache size 5 GB, meaning that the cache 18 can support at most five active regions 16.

An issue arises when the storage system 12 must service many thousands of disks 14, with many not performing much IO. The system 12 normally cannot garbage collect regions 16 which are still subject to allocation, however in a worst case, every other part of a block in a region 16 could have completed allocation, but one host block may be preventing garbage collection of the region 16 as allocation has not yet finished. The storage system 12 is configured to overcome this by closing regions 16 prior to total exhaustion of space in those regions 16. The storage system 12 does this by flushing caches and host blocks that belong to a given target region 16, allowing the storage system 12 to guarantee that no further writes will be performed against the region 16 once the flush has completed. The target region 16 is selected based on firstly the availability of resources, since tracking a single region costs memory, and the storage system 12 cannot support tracking of all regions 16 in memory and secondly on garbage collection characteristics.

In the storage system 12, the directory disks 20 map the virtual domain to the physical domain for various storage disks 14. Many virtual disks 20 refer to the same physical disk 14. The reverse-lookup structure 24 supports physical-to-virtual mappings, which is necessary for the garbage collection. When a read or write IO is received from the server 10 at the storage system 12, a vdisk 20 is assigned a single thread to perform the received IO. Multiple vdisks 20 will be running multiple threads at any one time. In a circumstance where a single thread is doing most work, with a few other threads servicing slow vdisks 20, this means that this single thread will be starved of space in the cache 18. The storage system 12, via the storage allocator 26 uses middle-level free lists, which are per-thread data structures containing multiple host blocks. These allocate parts of regions 16 from the top-level allocator 26, and allow for lockless, fast access to new blocks from host-disk allocators. The host-disk level allocators track the current host-block allocated to them, and attempt to pack as many host-writes into a single block prior to asking for additional blocks from the free list.

The storage system 12 is configured to operate so that when the system 12 gets close to having N regions active and cannot perform additional allocation to a free list, then the system 12 performs a series of steps to respond to this in order to free up memory. This mechanism first identifies a target region 16 out of the N live regions 16 based on, for example garbage collection characteristics and outstanding IO operations. A fitness function ranks these regions 16 and the lowest ranked region 16 is harvested. Such a fitness function could be based on one or more of the following, firstly, the number of blocks yet to be written to, secondly, the expense of garbage collection (since random workloads are typically harder to garbage collect than sequential ones as they cause fewer metadata cache hits) and thirdly, the number of free blocks available (since a high-rewrite workload may result in many blocks being rewritten in a single workload, for example if a user was rewriting the same block, over and over, then a whole region may have just one live block).

Once a region 16 is selected for harvesting, the region 16 is subject to two asynchronous flushes (in order). The first flush targets the free lists and to achieve this a message is sent to every thread that allocated from a given region 16 to purge their free lists of any blocks that belonged to the region 16, and to callback once completed. The second flush targets the host-disk level allocators and to achieve this a message is sent to every vdisk 20 that allocated from a given region 16 to stop writing to their current block and request additional storage from the free list, and to callback once completed. To perform this efficiently, the top-level region allocator 26 must track region utilization by the threads (this can be trivially performed via a bitmap). For the host-disk allocators, the storage system 12 must track on a per-thread level. Flushing potentially thousands of disks 14 without this is possible, but not desirable. The expense of this is a small amount of memory per thread, which could be implemented as a bitmap per active region, per thread is required to be at least (number_of disks/8) bytes big.

Once all threads and host-disks 20 have responded and called-back that a region's storage is no longer in active use, the region 16 can be removed from the set of active regions 16 and a new region 16 allocated. If necessary, metadata associated with the region 16 can be removed from memory 18 at this point. The region 16 which has just closed can be a garbage collection candidate from this point on. When garbage collected, the entire region 16 can be unmapped by the storage system 12, allowing for efficient storage reclamation. Volumes identified for garbage collection can be grouped into a separate allocation group. By doing this, the storage system 12 can coalesce slow vdisks 20 into single regions 16 and avoid having to perform too many flushes. The net result of this solution is a system capable of efficiently using tier 1 flash in a resource efficient fashion.

Figure 2:
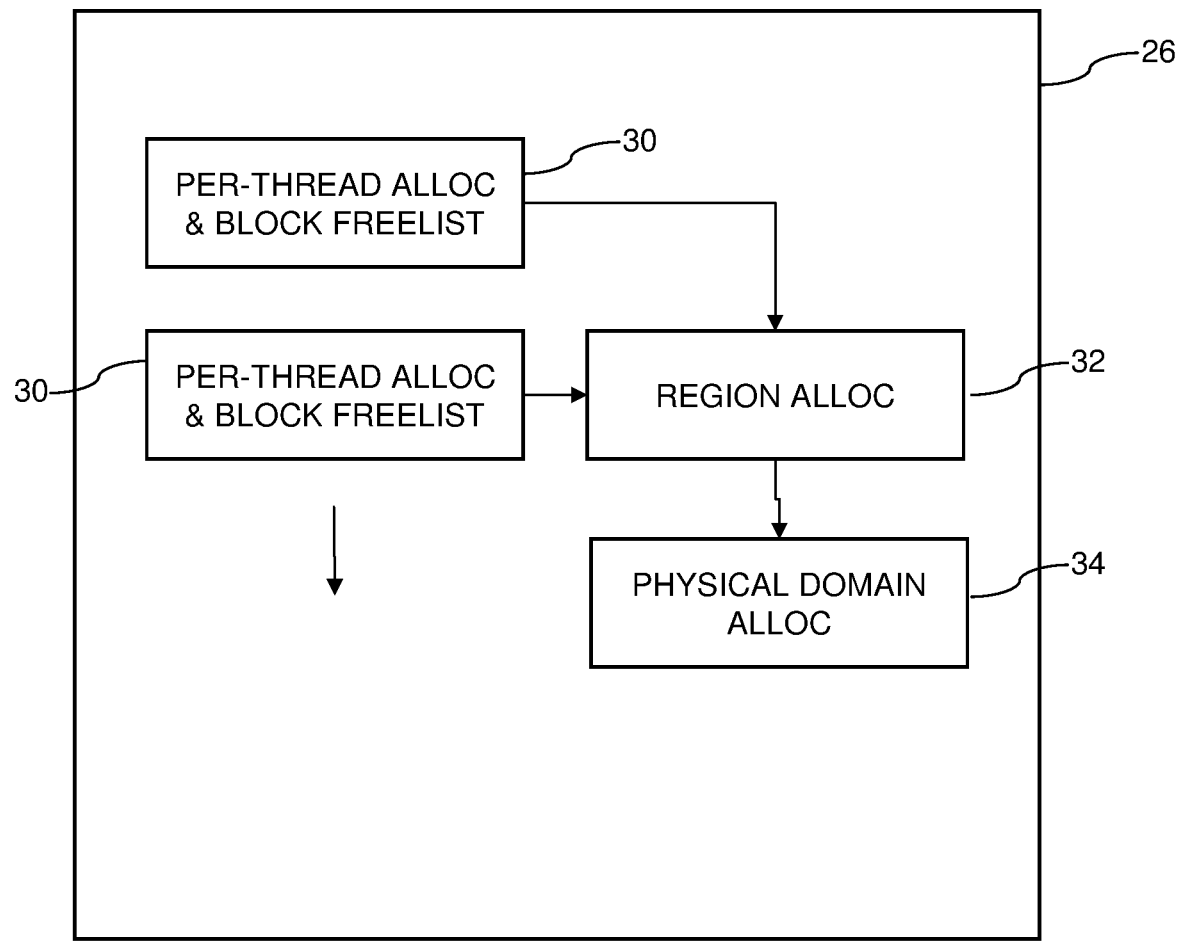
FIG. 2 is a schematic diagram of a storage allocator.

FIG. 2 is more detailed schematic diagram of the storage allocator 26. The storage allocator 26 maintains a number of data structures, which include per-thread allocators 30, a region allocator 32 and a physical domain allocator 34. In the context of the storage system 12, a thread is a sequence of instructions that relate to the same task, such as a read or write operation received from the server 10. Each per-thread allocator 30 includes a free data block list, which is a free list of the data blocks allocated to the thread in question. If a thread has free data blocks on its free list that belong to a live region 16, and no vdisk 20 is allocating the blocks, then these blocks are effectively stuck.

The region allocator 32 maintains metadata relating to the current live region 16 and one or more historic regions (which have been fully allocated, but are not necessarily full since data may not have been written to all of the blocks of the regions 16). The region allocator 32 maintains outstanding block counts for each of the regions 16 (live and historic) that are the responsibility of the region allocator 32. For blocks that are stuck, this prevents the outstanding block count on the region tracker from running down to zero (at which point the region in question would be destaged). The region allocator 32 requests new live regions from the physical domain allocator 34, which keeps a track of which regions 16 are free or used within the physical disks 14.

In terms of the hierarchy of the operation of the storage allocator 26, a vdisk 20 on thread number X requests data blocks from its respective per-thread allocator 30, which consults its free data block list to allocate a block to the thread in question, which can then use that block to write data. Each per-thread allocator 30 requests new data blocks from the region allocator 32 when the free data block list is running low on space. The region allocator 32 than allocates blocks to the requesting per-thread allocator 30 from the current live region 16. When the region allocator 32 is about to run out of space to allocate, then the region allocator 32 requests new live regions 16 from the physical domain allocator 34.

Figure 3:
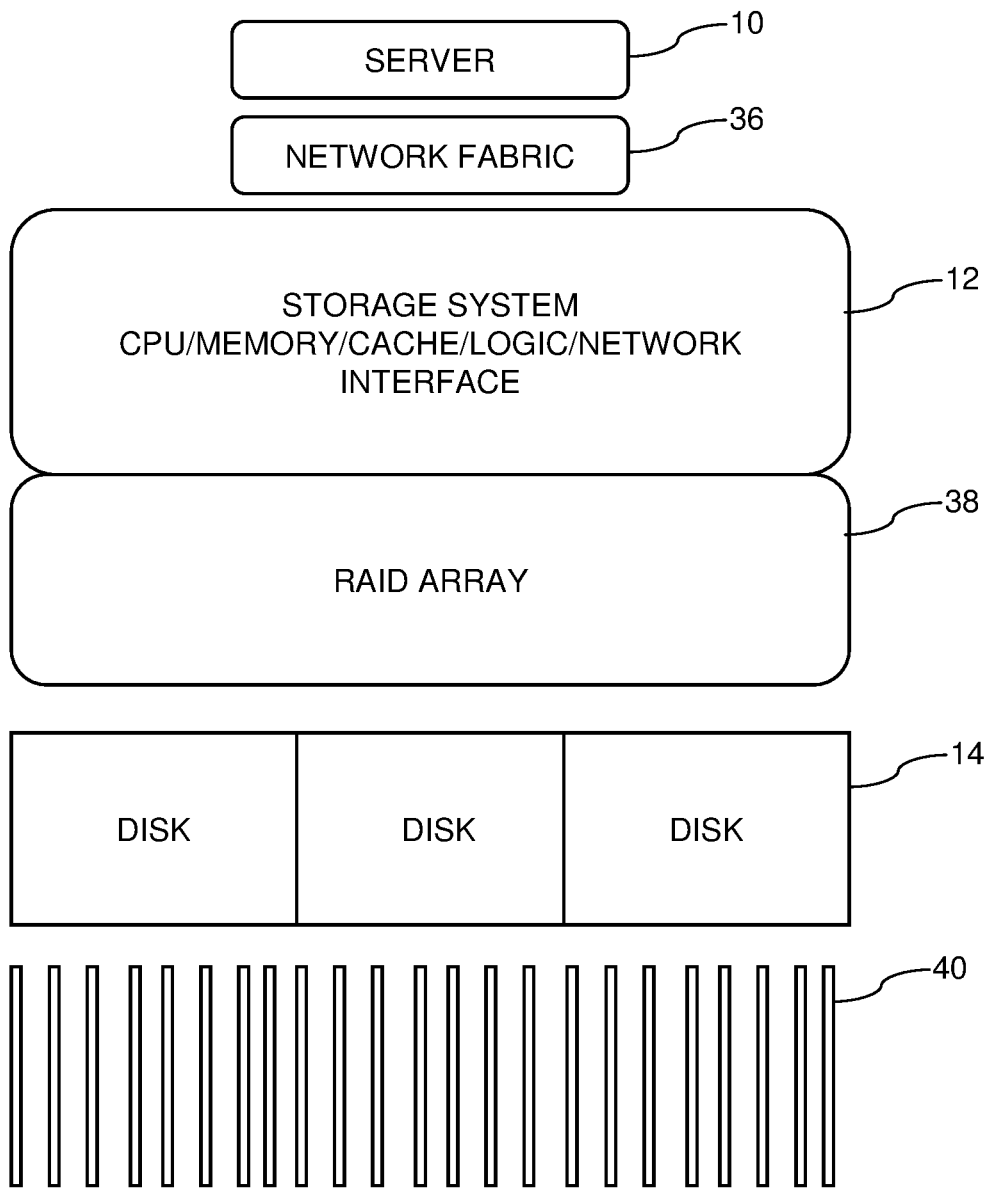
FIG. 3 is a further schematic diagram of the server and storage system.

FIG. 3 shows schematically the hierarchy of the components in the storage system 12, connected to the server 10 above and the physical disks 14 below (a disk being any form of physical storage not just traditional rotating disks). The server 10 is connected to the storage system 12 via network fabric 36. The storage system 12 comprises one or processors, various memory devices, a write cache and logic to implement the thin-provisioning of the disks and presents them to the server 10 via a network interface. Below the storage system 12 is a RAID array 38, which connects to the disks 14. The RAID stack 38 is implemented in hardware or software and is accessible by the storage system 12. The RAID array 38 is a storage scheme that primarily introduces data redundancy in order to protect against hardware failure.

The disks 14 are implemented the storage capacity either via flash chips and/or spinning disks etc. The flash chips 40 implement the disks 14 and the write quantum of the flash chips 40 determines the minimum size of the allocation region 16 implemented with the storage allocator 26, as discussed above.

Figure 4:
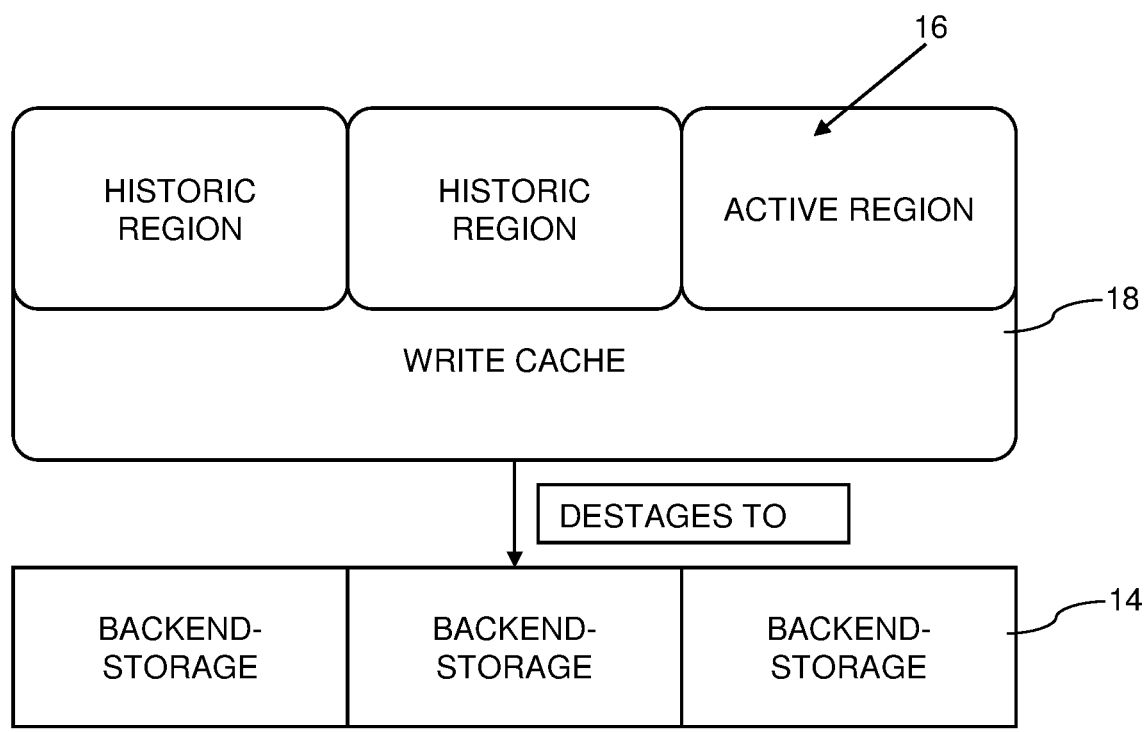
FIG. 4 is a schematic diagram of a write cache connected to backend storage.

FIG. 4 shows schematically the interaction between the write cache 18 and the backend storage 14. The write cache 18 has within it a number of the regions 16 that have been allocated by the storage allocator 26. In this example, three regions 16 are illustrated, two of which are historic regions (meaning that all of the memory space has been allocated, although not necessarily written to) and one of which is an active region (meaning that the storage allocator 26 is allocating blocks from this region 16 to the per-thread allocators 30 as and when they are requested). The allocator 26 can have a number of regions 16 with active data blocks (data allocated to vdisks 20) equal to those that will fit in the write cache 18, in this example three regions 16, although in practice the write cache 18 will support a larger number of regions 16. The allocator 26 is actively allocating new data blocks from the single active region 16 and waiting for the vdisks 20 to complete writing to data blocks from historic regions 16. When a region 16 is completely written to, the cache 18 destages all of the writes in the region 16 to a disk 14 in one sequential IO stream.

Figure 5:
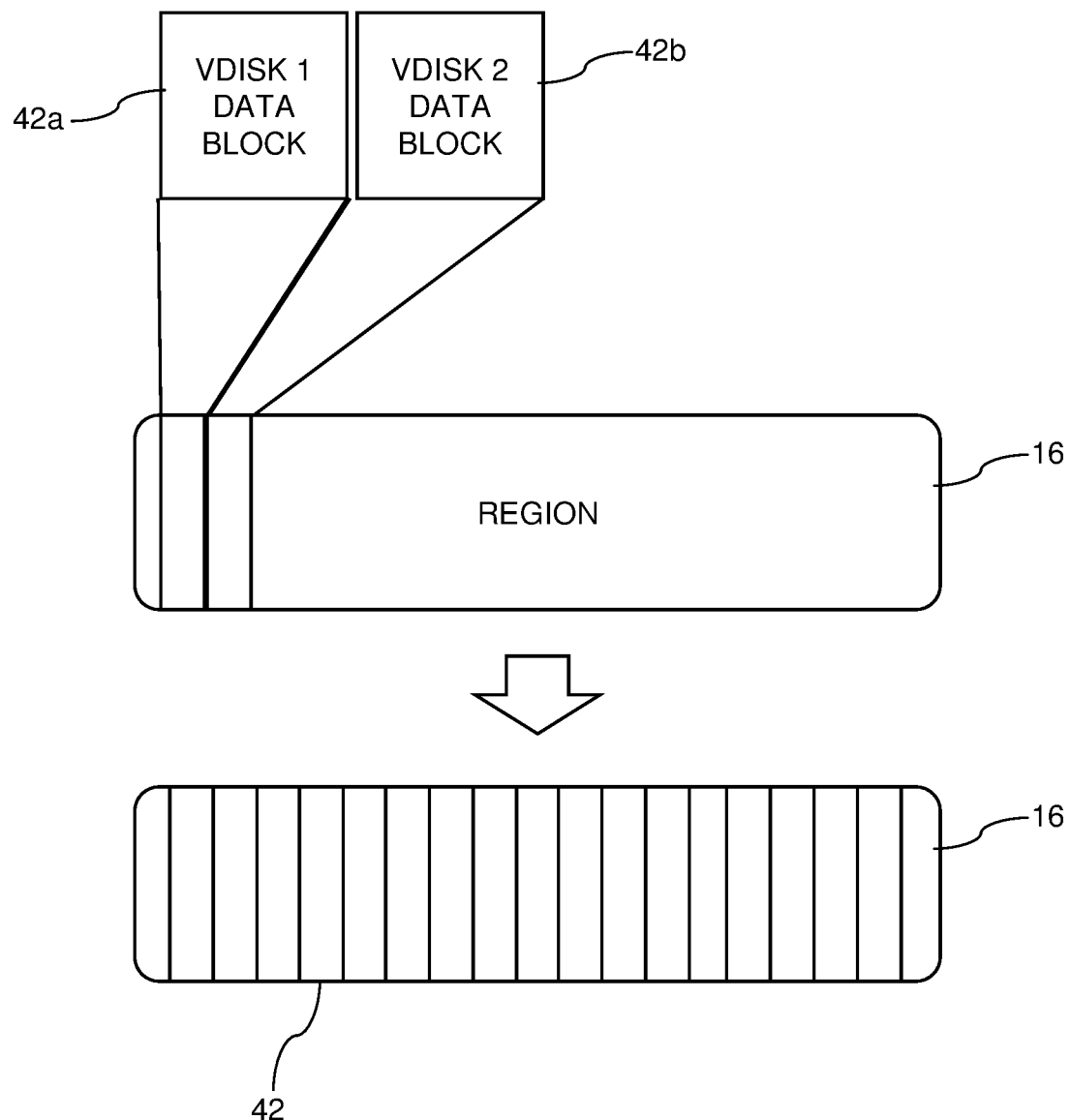
FIG. 5 is a schematic diagram of an allocated memory region being written to by two different virtual disks.

FIG. 5 illustrates how two vdisks 20 operate in relation to a single region 16. At the start of the process, there is an empty region 16, with a first block 42a allocated to a first vdisk 20 thread and a second data block 42b allocated to a second vdisk 20 thread. A host (the server 10) performs a single write to vdisk1's data block, not filling it entirely. The host performs no further writes to this data block 42a, causing it to be allocated, but never to be fully used up. The second vdisk2 has a continuous write workload.

After some time has passed (shown in the lower part of the Figure), then the vdisk2 will continue to fill up the region 16 as further blocks 42 are allocated to the vdisk2 and used by that vdisk 20 to write data to the blocks 42. At this point, all of the blocks 42 within the region 16 have been allocated and all have had data fully written to them except for the first block 42a allocated to vdisk1. In this situation, vdisk1's data block 42a still has not been completed, so the region 16 cannot be closed, despite most of the region 16 being ready for destaging. If the storage system 12 destaged the region 16 from the write cache 18 and then vdisk1 later completed the first data block 42a, the flash chip 40 to which the data is being written may have to rewrite the entire region's worth, rather than just the data block 42 in question, which is inefficient and shortens the lifespan of the flash chip 40.

Figure 6:
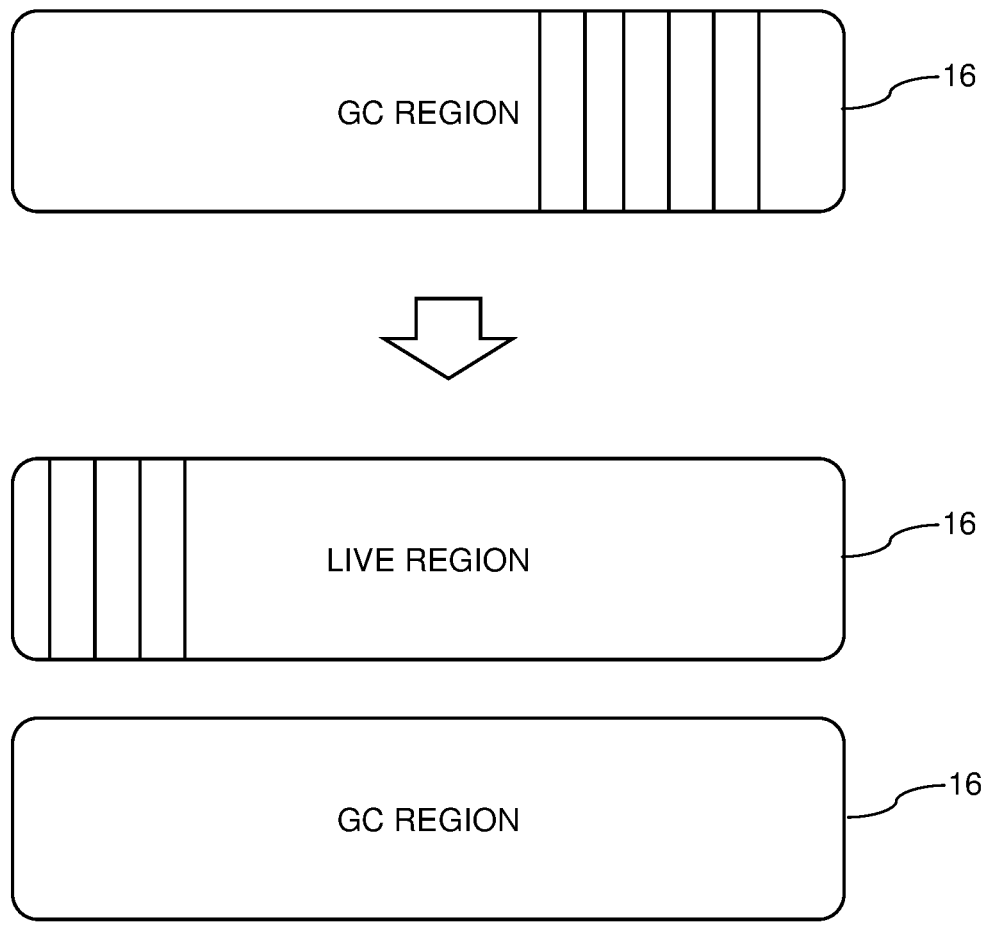
FIG. 6 is a schematic diagram of a garbage collection operation on a memory region.

FIG. 6 shows how the garbage collector 28 operates to clear a region 16 for reuse. The reverse lookup structure 24 describes physical domain and virtual addresses associated with data blocks on disk (within the write cache 18). The region 16 labelled in FIG. 6 as a "GC REGION" is a region 16 on which the garbage collector 28 will work in order to clear and reuse the region 16. By rewriting host data this results in old data being freed. As such, a previously full region 16 can have a small amount of live data. The garbage collector 28 creates new IOs moving the remaining data blocks to the current live region 16. The forward lookup structure 22 is with the new address location. The garbage collection IOs are added to the live region 16 and the garbage collection region 16 can now be used as free space. A command can then be sent to the underlying storage associated with the garbage collection region 16 following the garbage collection operation. Within the SCSI standard this could be an UNMAP or TRIM command. This action allows the user to inform the flash chip(s) that the data has been fully freed.

Figure 7:
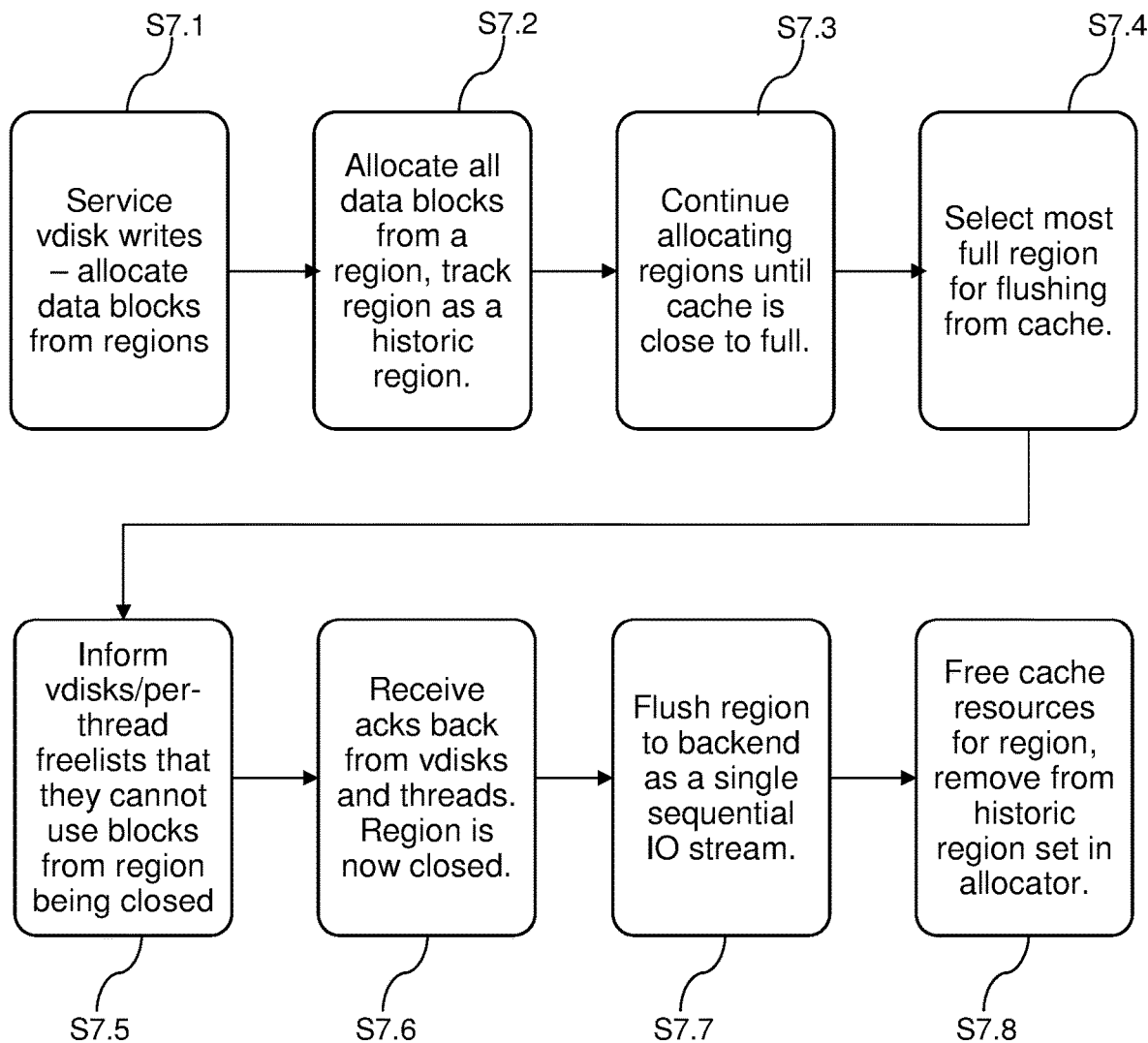
FIG. 7 is a flowchart of a method of operating the storage system.

The top level operation of the storage system is shown in the flow diagram of FIG. 7. In the first step S7.1, the service vdisk 20 performs a write operation, for which data blocks 42 are allocated from a live region 16. At step S7.2, this process continues with all data blocks 42 from the region 16 being allocated at which point the region is marked as an historic region 16. At step S7.3, the storage allocator 26 will continue allocating regions until the write cache 18 is close to full. At step S7.4, the storage system 12 will select the most optimum region 16 for flushing from the cache 18. The most optimum 16 is not necessarily the fullest region 16, other criteria could be used to make this determination.

At step S7.5, the storage system 12 informs the vdisks 20 and the relevant free lists that they cannot use the blocks 42 from the region 16 that is being closed. At step S7.6, the storage system 12 receives acknowledgements back from the vdisks 20 and threads and the region 16 is now closed. At step S7.7, the region 16 is flushed to the backend storage 14 as a single sequential IO stream. At step S7.8, the cache resources are freed for the region 16 that has just been flushed and the storage allocator 26 removes the region 16 from the set of historic regions 16 defined by the allocator 26.

Figure 8:
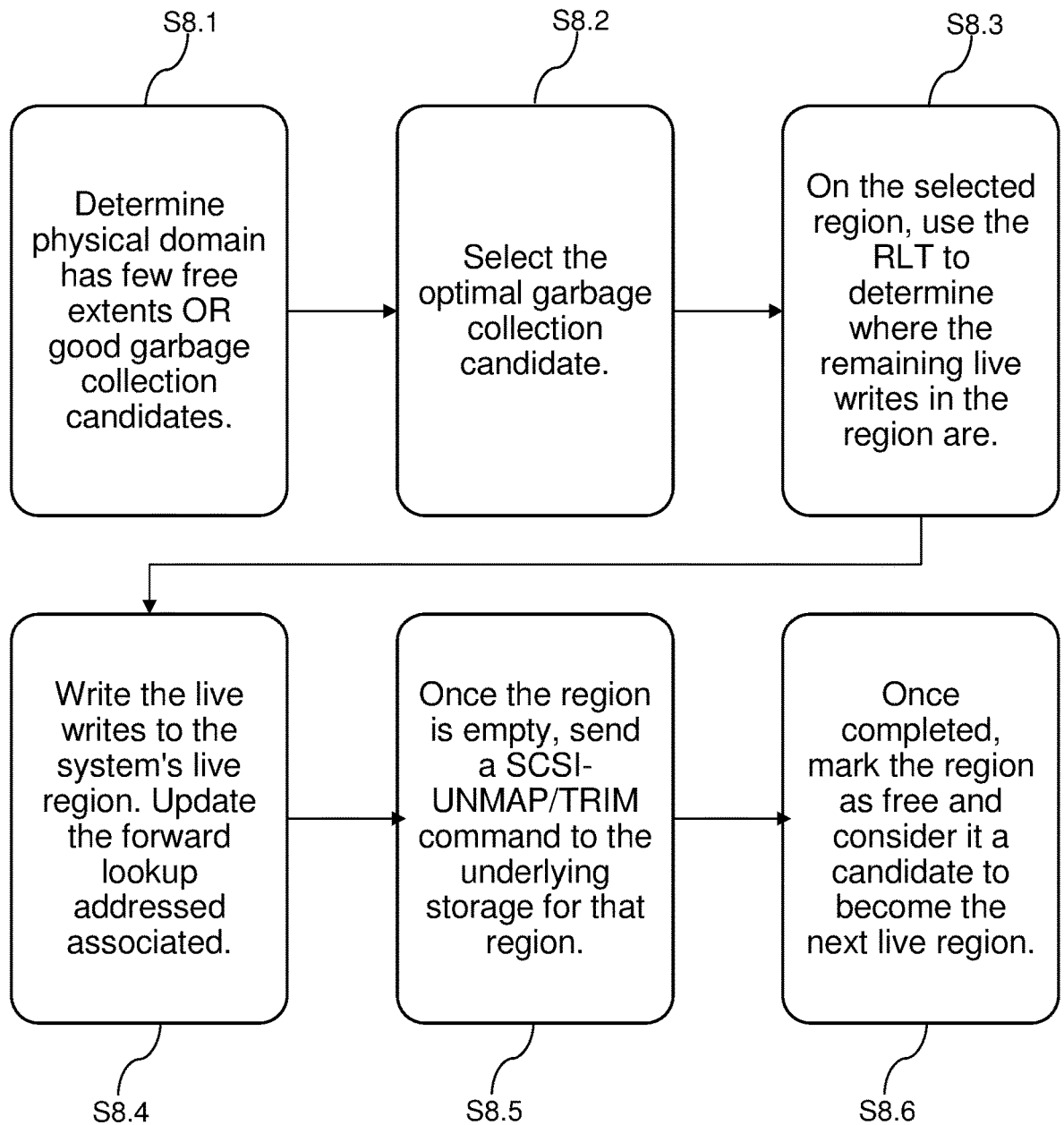
FIG. 8 is a flowchart of a method of performing garbage collection.

FIG. 8 is a flowchart of the garbage collection process. Step S8.1 comprises determining the physical domain that has few free extents or good garbage collection candidates. At step S8.2, the garbage collector 28 selects the optimal garbage collection candidate and at step S8.3, for the selected region 16, uses the reverse lookup structure 24 to determine the location of the remaining live writes in the region 16. At step S8.4, the storage system 12 writes the live writes to the systems live region 16 and updates the forward lookup structure 22 as appropriate. At step S8.5, once the region 16 is empty a SCSI UNMAP/TRIM command is sent to the underlying storage for that region 16. At step S8.6, once this is completed, then the storage system 12 marks the region 16 in question as free and considers the region 16 as a candidate to become the next live region 16.

FIGS. 9, 10, 11A, and 11B are three flowcharts that show a more detailed embodiment of the operation of the storage system 12, in relation to the allocation of memory space to the vdisks 20 and to the recycling of memory regions 16. The flowchart of FIG. 9 starts with step S9.1, which comprises receiving a write at a vdisk 20. The next step of the method is step S9.2, at which a check is made to see if the vdisk 20 has space allocated for the received write. If the answer is no, then the flowchart moves to step S9.3, which is the operation of the space allocation logic, which is contained in FIGS. 11A and 11B. If the answer is yes, then the flowchart moves to step S9.4, at which the vdisk 20 performs the write using the allocation space.

Figure 9:
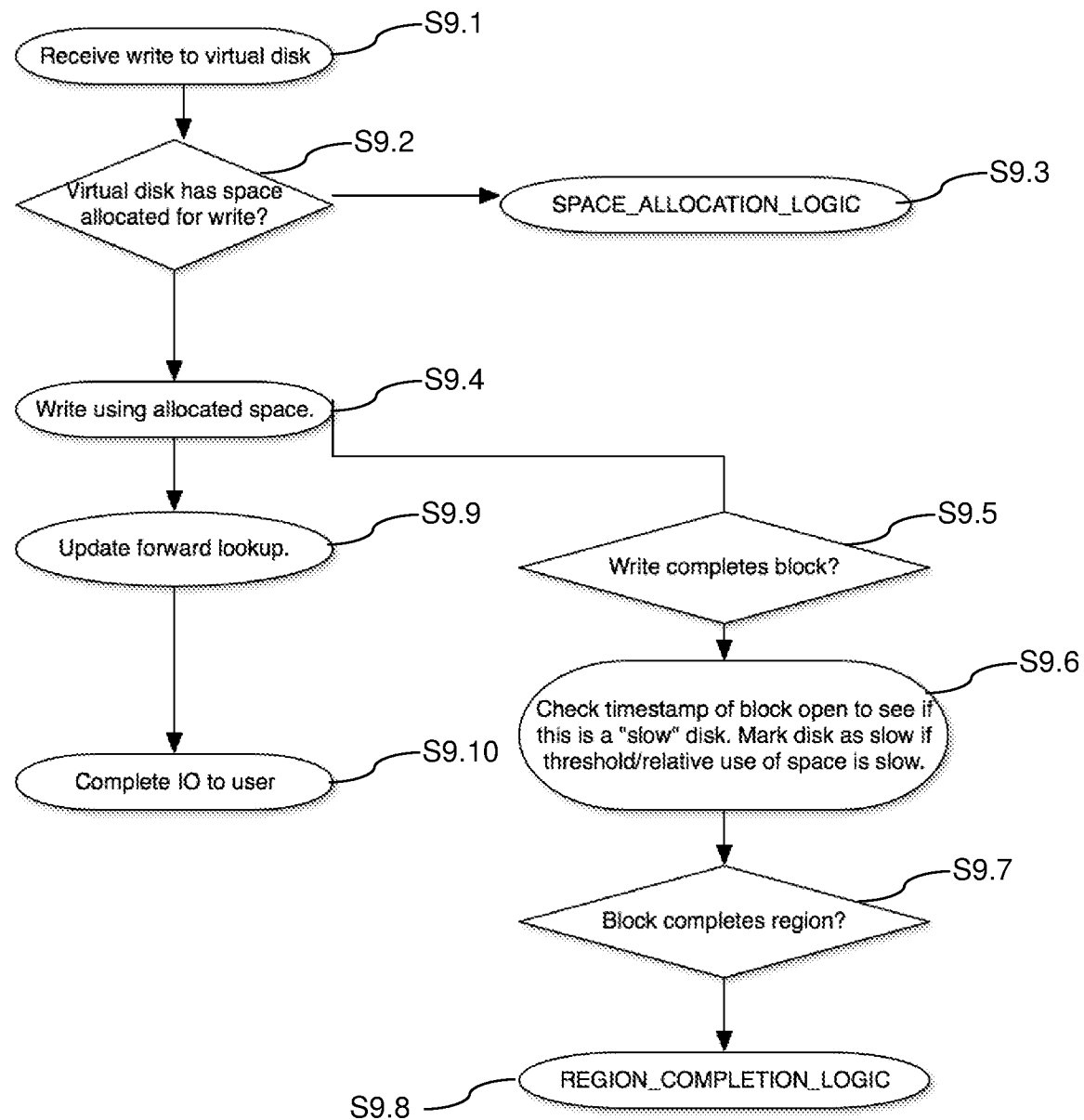
FIG. 9 is a flowchart of a method of processing a write request.

The flowchart of FIG. 9 now continues in parallel, moving to step S9.5, where a check is made to see if the write completes the current block 42. If yes, then the process moves to step S9.6, where the timestamp of the block open is checked to see if this is a "slow" vdisk 20 (i.e. that the vdisk 20 is taking a relatively long time to fill up the blocks 42 allocated to the vdisk 20 in question). A threshold can be applied to the time taken to complete the block 42 to determine whether the vdisk 20 is "slow". The vdisk 20 in question is then marked as slow if the threshold or relative use of space is slow. The process then moves to step S9.7, where a check is made to see if the completed block 42 completes the live region 16. If yes, then the process moves to step S9.8 which is the operation of the region completion logic, which is contained in FIG. 10. In parallel to the process steps S9.5 to S9.8, the process moves to step S9.9, which comprises updating the forward lookup structure 22 and then completes at step S9.10, which comprises completing the IO to the user.

Figure 10:
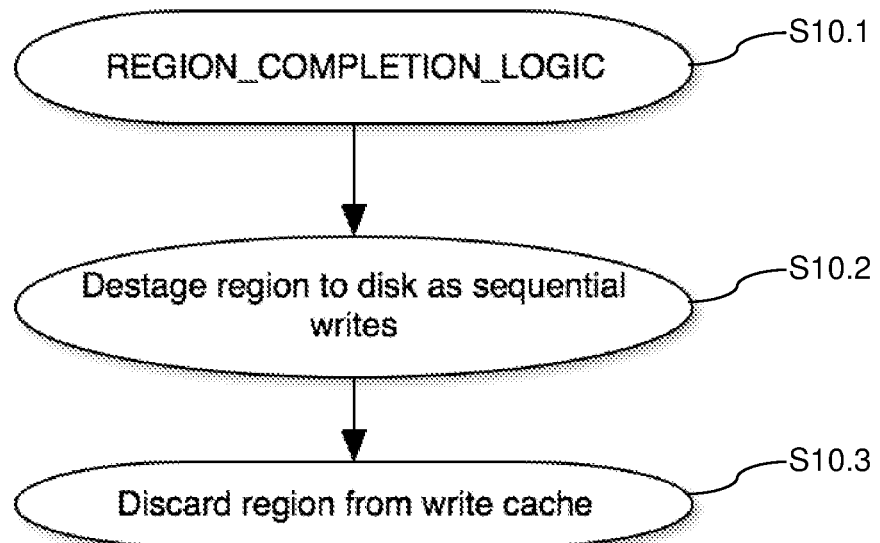
FIG. 10 is a flowchart of a method of performing region completion.

FIG. 10 shows the region completion logic that is called by the step S9.8 of FIG. 9. The region completion logic starts with step S10.1 and then moves to step S10.2 where the completed region 16 is destaged to disk 14 as sequential writes. The process completes at step S10.3, where the region 16 in question is discarded from the write cache 18.

Figure 11A:
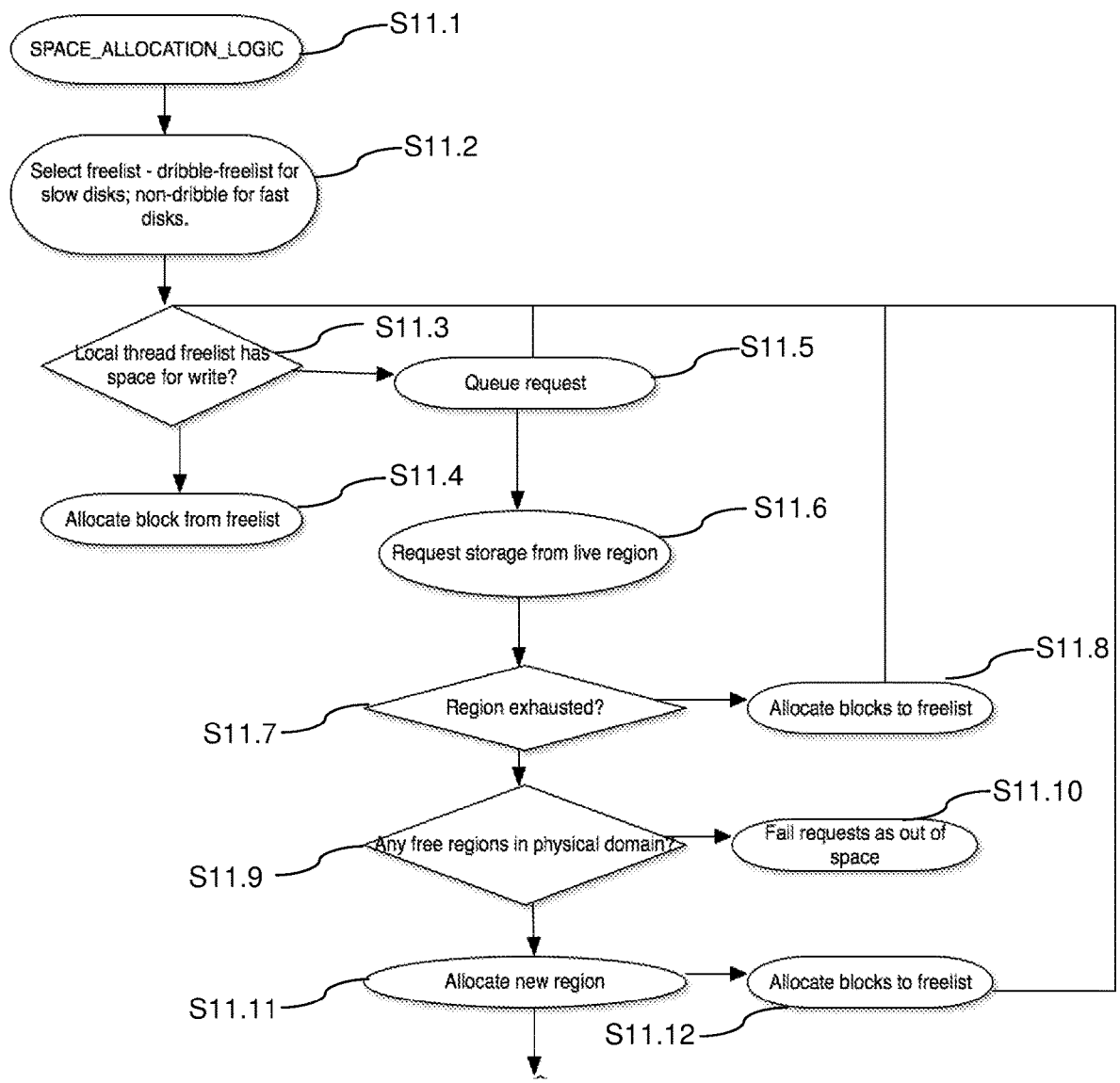
FIGS. 11A and 11B provide a flowchart of a method of performing space allocation.
Figure 11B:
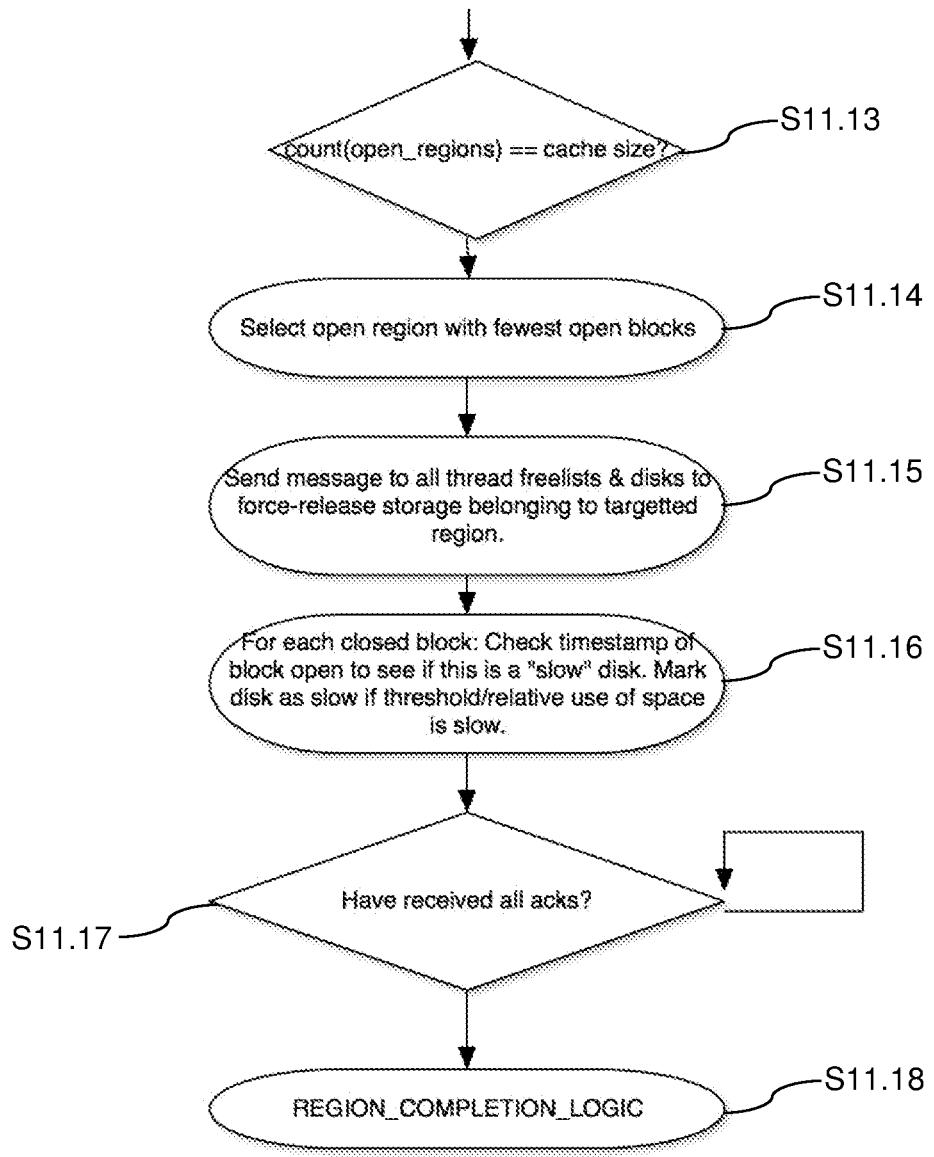

FIGS. 11A and 11B show the space allocation logic that is called by the step S9.3 of FIG. 9. This process starts at step S11.1 and then continues with step S11.2, which comprises selecting a free list, using a "dribble" free list for slow vdisks 20 and using a "non-dribble" free list for non-slow vdisks 20. At step S11.3, the process makes a check to see if the local thread free list has space for the current write. If yes, then the process continues to step S11.4, where a block 42 is then allocated from the free list and the process terminates. If the answer is no however, the process continues to step S11.5, where the current request is queued.

The process then continues to step S11.6 where a request is made for storage from the current live region 16. At step S11.7, a check is made to see if the current live region 16 is exhausted or not. If the answer is no, then the method moves to step S11.8 where blocks 42 from the current live region 16 are allocated to the free list. The method then returns to step S11.3 and continues from there. If the answer is yes, then the method moves to step S11.9, where a check is made to see if there is any free space in the physical domain (the disks 14). If the answer is no, then the method terminates at step S11.10 where the request is failed as out of space. If there is free space in the physical domain, then the method moves to step S11.11, where a new region 16 is allocated and at step S11.12, blocks 42 from this new region 16 are allocated to the free list and the method returns to step S11.3.

In addition, the method also continues to step S11.13, where a check is made to see if a count of the open regions 16 is equal to the cache size. If no then the method terminates at this point as there is space in the cache 18 for a new region 16. If yes, then at step S11.14, there is selected the open region 16 with the fewest open blocks 42. At step S11.15 a message is sent to all thread free lists and vdisks 20 to force the release of all storage belonging to the targeted region. The process then proceeds to step S11.16 where for each closed block 42 a check of the timestamps of each open block 42 to see if the block relates to a "slow" vdisk 20. The vdisk 20 is marked as "slow" if the threshold or relative use of space is slow. At step S11.17 a check is made to see if all acknowledgements have been received from the free lists and vdisks 20 that received messages as a result of the action of step S11.15. If no, then the process cycles on this step until all the acknowledgements have been received at which point the process moves to step S11.18, which is the calling of the region completion logic that is detailed above and shown in FIG. 10.

Figure 12:
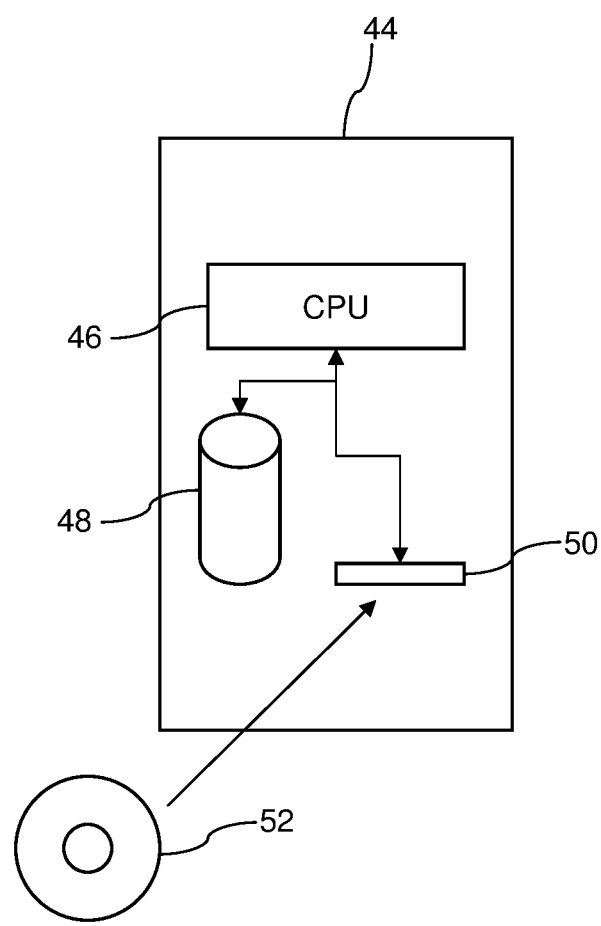
FIG. 12 is a processor of the data storage system.

FIG. 12 shows a processing component 44 that can form part of the storage system 12 of FIG. 1. The processing component 44 comprises a processor 46 that is operating the storage allocator 26 and may also be operating other components such as the garbage collector 28. The processor 46 is also connected to a local storage device 48 and to a local interface 50. A computer readable storage medium 52 is provided, which is a CD-ROM 52 storing a computer program product that can be used to control the processor 46. The processor 46 executes instructions from the computer program product.

Essentially, the processor 46 is arranged to maintain a set of active regions 16 in the cache memory 18, each active region 16 having a size equal to an integer multiple of an update size of a flash chip within the physical storage 14, where the integer could be 1. The processor 46 receives requests for one or more blocks 42 of the cache memory 18 from components such as vdisks 20 within the storage system 12 and allocates one or more blocks 42 from an active region 16 in response to a received request. If the processor 46 determines that all blocks 42 in an active region 16 have been allocated and that all allocated blocks 42 within this region 16 have been written to, then the processor 46 destages the content of this region 16 to the physical storage 14.

If the processor 46 determines that no further blocks 42 can be allocated from any active region 16, then the processor 46 selects a target region 16 from the regions 16 and instructs all components (for example vdisks 20, threads and free lists) within the storage system 12 that have allocated blocks 42 for the target region 16 to stop writing to their allocated blocks 42 for the target region 16. Once confirmation has been received from all of the components, the processor 46 destages the content of the target region 16 to the physical storage 14. As described above, in order to select a target region 16 from the regions 16, the processer operates a fitness function on each of the regions 16 to determine the most suitable region 16 as the target region 16. The operating of the fitness function can preferably comprise determining the region 16 with lowest number of blocks 42 yet to be written to amongst all regions 16 and defining the target region 16 as the region 16 with lowest number of blocks 42 yet to be written to amongst all regions 16.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method of operating a data storage system comprising physical storage, cache memory, and a processor connected to the physical storage and the cache memory, the method comprising:
   maintaining a set of active regions in the cache memory, each active region having a size equal to an integer multiple of an update size of a flash chip within the physical storage, the update size reflecting the total storage capacity of the flash chip;
   receiving requests for at least one block of the cache memory;
   allocating at least one block from an active region in response to a received request;
   determining that all blocks in an active region have been allocated and that all allocated blocks within this active region have been written to; and
   destaging content of this active region to the physical storage.

2. The method according to claim 1, further comprising determining that no further blocks can be allocated from any active region, selecting a target region from the regions, instructing all components within the data storage system that have allocated blocks for the target region to stop writing to their allocated blocks for the target region, and destaging content of the target region to the physical storage.

3. The method according to claim 2, wherein selecting the target region from the regions comprises operating a fitness function on each of the regions to determine a most suitable region as the target region.

4. The method according to claim 3, wherein operating the fitness function comprises determining a region with a lowest number of blocks yet to be written to amongst all regions and defining the target region as the region with the lowest number of blocks yet to be written to amongst all regions.

5. The method according to claim 2, further comprising, before destaging the content of the target region to the physical storage, instructing all components within the data storage system maintaining free lists including at least one block from the target region to remove the at least one block from their free lists.

6. A data storage system comprising physical storage, cache memory, and a processor connected to the physical storage and the cache memory, the processor arranged to:
   maintain a set of active regions in the cache memory, each active region having a size equal to an integer multiple of an update size of a flash chip within the physical storage, the update size reflecting the total storage capacity of the flash chip;
   receive requests for at least one block of the cache memory;
   allocate at least one block from an active region in response to a received request;
   determine that all blocks in an active region have been allocated and that all allocated blocks within this active region have been written to; and
   destage content of this active region to the physical storage.

7. The system according to claim 6, wherein the processor is further configured to determine that no further blocks can be allocated from any active region, select a target region from the regions, instruct all components within the data storage system that have allocated blocks for the target region to stop writing to their allocated blocks for the target region, and destage content of the target region to the physical storage.

8. The system according to claim 7, wherein the processor is configured to, when selecting the target region from the regions, operate a fitness function on each of the regions to determine a most suitable region as the target region.

9. The system according to claim 8, wherein the processor is configured to, when operating the fitness function, determine a region with a lowest number of blocks yet to be written to amongst all regions and define the target region as the region with the lowest number of blocks yet to be written to amongst all regions.

10. The system according to claim 7, wherein the processor is further configured to, before destaging the content of the target region to the physical storage, instruct all components within the data storage system maintaining free lists including at least one block from the target region to remove the at least one block from their free lists.

11. A computer program product for controlling a data storage system comprising physical storage, cache memory, and a processor connected to the physical storage and the cache memory, the computer program product comprising a non-transitory computer readable storage medium having program instructions embodied therewith, the program instructions executable by a processor to cause the processor to:

maintain a set of active regions in the cache memory, each active region having a size equal to an integer multiple of an update size of a flash chip within the physical storage, the update size reflecting the total storage capacity of the flash chip;

receive requests for at least one block of the cache memory;

allocate at least one block from an active region in response to a received request;

determine that all blocks in an active region have been allocated and that all allocated blocks within this active region have been written to; and destage content of this active region to the physical storage.

12. The computer program product according to claim 11, wherein the program instructions further cause the processor to determine that no further blocks can be allocated from any active region, select a target region from the regions, instruct all components within the data storage system that have allocated blocks for the target region to stop writing to their allocated blocks for the target region, and destage content of the target region to the physical storage.

13. The computer program product according to claim 12, wherein the program instructions further cause the processor to operate a fitness function on each of the regions to determine a most suitable region as the target region.

14. The computer program product according to claim 13, wherein the program instructions further cause the processor to determine a region with a lowest number of blocks yet to be written to amongst all regions and define the target region as the region with the lowest number of blocks yet to be written to amongst all regions.

15. The computer program product according to claim 12, wherein the program instructions further cause the processor to, before destaging the content of the target region to the physical storage, instruct all components within the data storage system maintaining free lists including at least one block from the target region to remove the at least one block from their free lists.

* * * * *